UNITED STATES PATENT OFFICE.

THOMAS SMITH AND FRANK G. SHERRY, OF PITTSBURG, PENNSYLVANIA.

PROCESS OF WELDING STEEL AND COPPER.

SPECIFICATION forming part of Letters Patent No. 673,664, dated May 7, 1901.

Application filed September 5, 1900. Serial No. 29,079. (No specimens.)

*To all whom it may concern:*

Be it known that we, THOMAS SMITH and FRANK G. SHERRY, citizens of the United States of America, residing at Pittsburg, in the county of Allegheny and State of Pennsylvania, have invented certain new and useful Improvements in Processes of Welding Steel and Copper, of which the following is a specification.

This invention relates to certain new and useful improvements in a process for welding steel to copper.

The object of the invention is to provide a process whereby steel and copper may be easily welded together.

With the above and other objects in view the invention consists in combining certain ingredients and subjecting the same between a steel plate and a layer of copper, and upon the upper face of the copper, whereby the two metals may be effectually welded together when properly heated and reheated and subsequently placed between rolls or under the hammer, as the case may be.

In describing the invention in detail we will first give the component parts forming the flux, which consists of borax, lime, pulverized oyster-shell, and sand.

The process of producing the desired result of welding the two metals together is as follows: A steel plate is placed in a furnace and brought to a white heat. It is then withdrawn from the furnace, and the flux, composed of the above ingredients, is placed upon the surface of the steel plate. A cold sheet of copper is then placed upon the hot steel plate, and another layer of flux, composed of the above ingredients, is placed upon the copper plate, preventing the latter from fusing. Both plates are then placed in the furnace and allowed to remain there until a welding heat is obtained, when the plates are then passed through rolls or under a hammer, as the case may be, thereby effectually welding the steel and copper together.

It will be noted that various changes may be made as to the process of welding the two metals together and that the ingredients composing the flux may be used in the desired quantities and proportions, as we do not wish to confine ourselves to the exact proportions of the different ingredients composing the flux.

Having thus fully described our process, what we claim as new, and desire to secure by Letters Patent, is—

1. A process of welding steel to copper which consists in heating a steel plate to a white heat, placing a flux upon said steel plate, placing a copper plate upon the flux and steel plate, and then heating the two plates to a welding heat and subjecting the two metals to the rolls or hammer.

2. A process of welding steel to copper which consists in heating a steel plate to a white heat, then placing a flux upon the steel plate, placing a cold copper plate upon the flux and steel plate, coating the surface of said copper plate with a flux, then heating the two plates to a welding heat, and subjecting the two metals to the hammer or rolls.

3. A process of welding steel to copper which consists in heating the steel to a white heat, then treating it with a flux composed of borax, lime, pulverized oyster-shell, and sand, placing the copper upon the coated hot steel, then coating the copper with the flux, and then heating the two metals and welding the same together.

4. A process of welding steel to copper which consists in first heating the steel, applying a flux to the heated steel, placing the copper upon the flux-coated steel, then heating the two metals simultaneously, and finally subjecting the same to the pressure for welding.

5. A process of welding steel to copper which consists in first heating the steel, second coating the heated steel with a flux containing borax, third placing cold copper upon the coated steel, fourth coating the copper with the flux, fifth heating the two metals simultaneously, and finally passing the same between rolls or under a hammer for the welding, substantially as described.

6. A process of welding steel to copper which consists in first heating the steel, second applying a coating of flux containing borax and lime to the heated steel, third placing cold copper upon the coated steel, fourth coating the copper with the flux, fifth heating the two metals simultaneously, and finally passing the same between rolls or under a hammer for the welding.

7. A process of welding steel to copper which consists in first heating the steel, second applying a coating of flux containing borax, lime and pulverized oyster-shell to the heated steel, third placing cold copper upon the coated steel, fourth coating the copper with the flux, fifth heating the two metals simultaneously, and finally passing the same between rolls or under a hammer for the welding.

8. A process of welding steel to copper which consists in first heating the steel, second applying a coating of flux containing borax, lime, pulverized oyster-shell, and sand to the heated steel, third placing cold copper upon the coated steel, fourth coating the copper with the flux, fifth heating the two metals simultaneously, and finally passing the same between rolls or under a hammer for the welding.

9. A process of welding steel to copper which consists in first heating the steel, second applying a coating of flux containing lime to the heated steel, third placing cold copper upon the coated steel, fourth coating the copper with the flux, fifth heating the two metals simultaneously, and finally passing the same between rolls or under a hammer for the welding.

10. A process of welding steel to copper which consists in first heating the steel, second applying a coating of flux containing pulverized oyster-shell to the heated steel, fourth coating the copper with the flux, fifth heating the two metals simultaneously, and finally passing the same between rolls or under a hammer for the welding.

11. A process of welding steel to copper which consists in first heating the steel, second applying a coating of flux containing sand to the heated steel, fourth coating the copper with the flux, fifth heating the two metals simultaneously, and finally passing the same between rolls or under a hammer for the welding.

In testimony whereof we affix our signatures in the presence of two witnesses.

THOMAS SMITH.
FRANK G. SHERRY.

Witnesses:
JOHN NOLAND,
H. C. EVERT.